United States Patent
Starp

[15] 3,680,460
[45] Aug. 1, 1972

[54] MOTOR DRIVER DIAPHRAGM SHUTTER

[72] Inventor: Franz W. R. Starp, Black Forest, Germany

[73] Assignee: Prontor-Werk Alfred Gauthier G.m.b.H., Calmbach, Black Forest, Germany

[22] Filed: May 11, 1970

[21] Appl. No.: 36,079

[30] Foreign Application Priority Data

May 9, 1969 Germany............P 19 23 687.4

[52] U.S. Cl. ...............95/53 EA, 95/10 CT, 95/63
[51] Int. Cl. .........................G03b 7/08, G03b 9/24
[58] Field of Search .........95/53 E, 53 EA, 53 EB, 63

[56] References Cited

UNITED STATES PATENTS

| | | | |
|---|---|---|---|
| 3,421,427 | 1/1969 | Starp | 95/63 |
| 3,533,346 | 10/1970 | Erlichman | 95/53 EB |
| 3,533,345 | 10/1970 | Starp | 95/63 X |
| 3,476,031 | 11/1969 | Starp | 95/63 |
| 3,455,218 | 7/1969 | Eagle et al. | 95/53 EB |

*Primary Examiner*—Samuel S. Matthews
*Assistant Examiner*—Michael L. Gellner
*Attorney*—March, Le Fever & Wyatt

[57] ABSTRACT

A photographic camera is provided with a shutter blade system that simultaneously serves to set the shutter opening. The shutter blade system is movable out of the closed position by means of a setter in opposition to the force of a return spring. A motorized drive operates to open the shutter blade system and is operatively connectable to the setter so as to periodically switch the setter ahead. An electronic control device is operatively connected to the motorized drive. The control device, relative to the time of the start of the motor drive, provides a switch impulse to an electro-mechanical mechanism which brings about a separation of the connection between the motorized drive and the setter according to a pre-selected or light-dependent determined time interval ascertained by a light-sensitive element.

8 Claims, 10 Drawing Figures

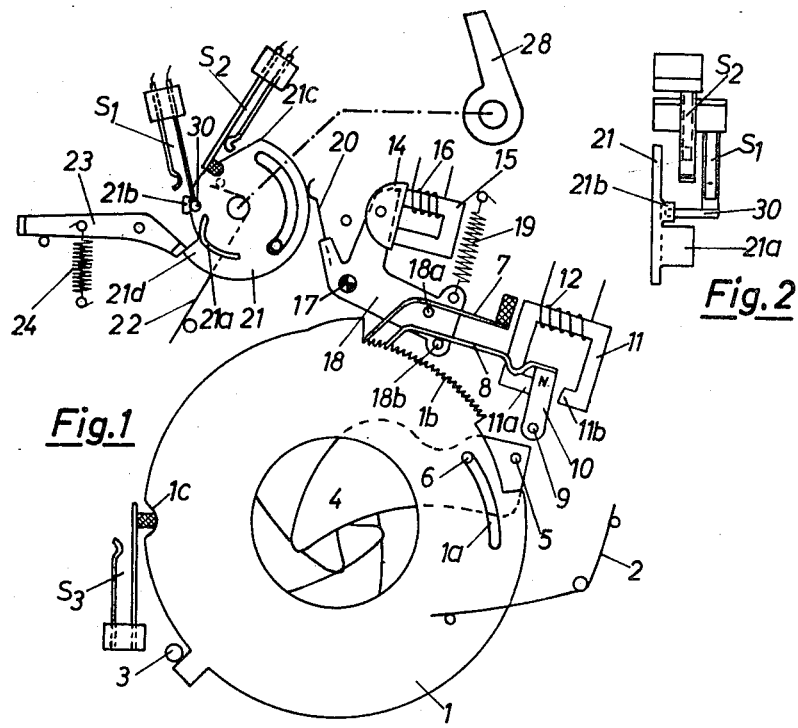
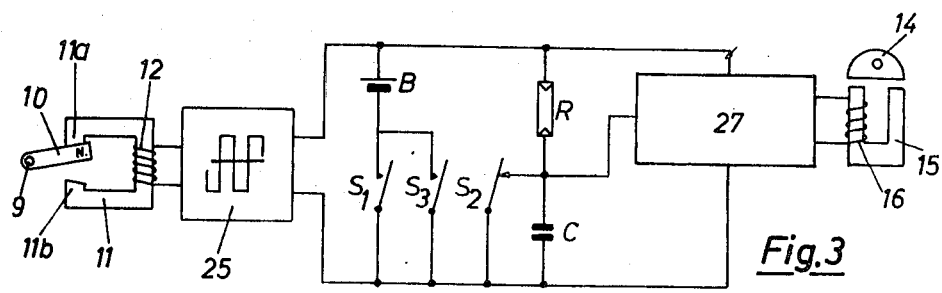
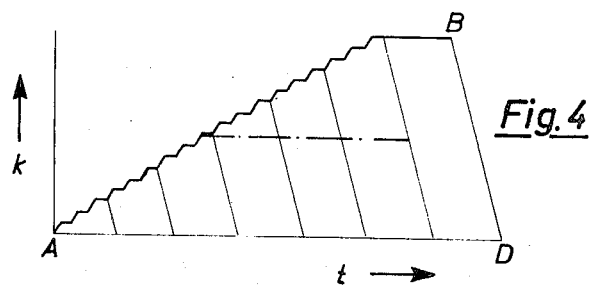
INVENTOR
Franz W. R. Starp
BY
Arthur A. March
ATTORNEY

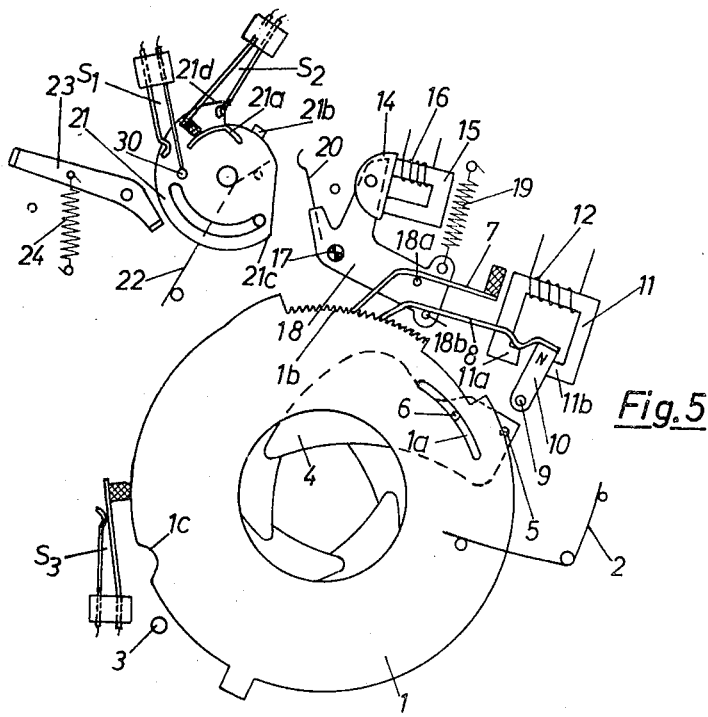
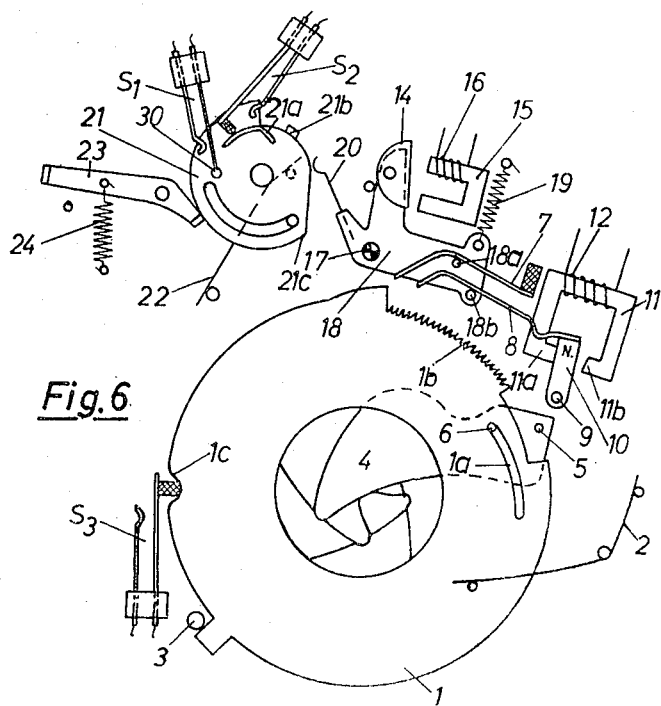

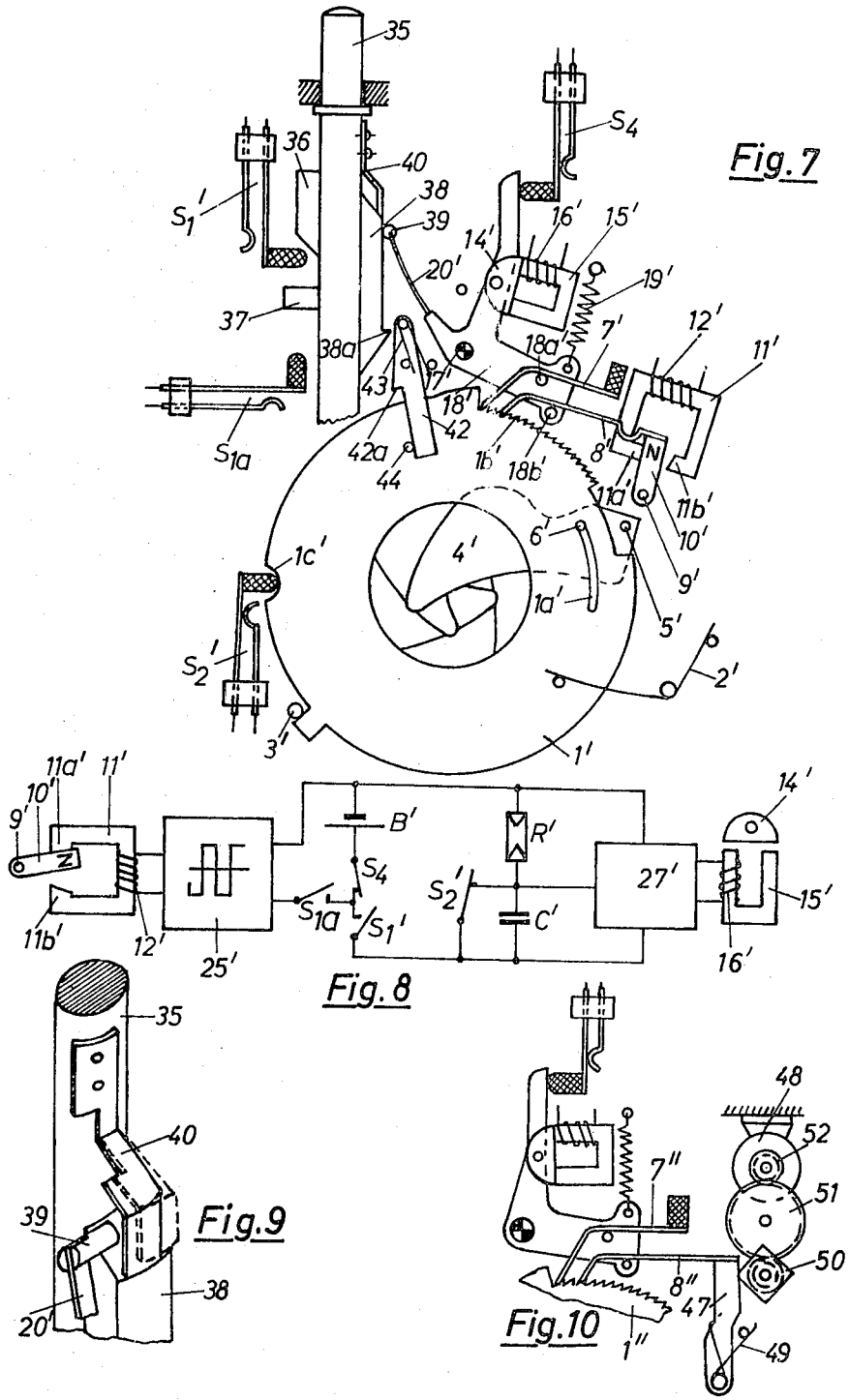

MOTOR DRIVER DIAPHRAGM SHUTTER

The invention concerns a photographic camera with a shutter blade system which simultaneously serves to set the shutter, and which can be taken out of the closed position by means of an adjusting device in opposition to the force of a return spring. A program-shutter is already known which has fixed exposure-time-shutter pairing (exposure time/opening pairing), where the shutter blades simultaneously take over the function of setting the shutter. The drive of the shutter system is fully mechanical using one opening spring and one closing spring. This drive is accomplished by a drive ring that moves forward or backward and the shutter system is thus moved into the open and then again into the closed position. In essence the characteristic of this shutter design is that a time function, accomplished by means of a mechanical blocking apparatus, determines the shutter setting. The blocking apparatus slows the opening movement of the shutter system in such a way that from the beginning of the opening movement to the total release of the full shutter opening, a relatively long period of time, for instance about 60 ms, passes, which in turn leads to a very flat opening characteristic of the shutter system. To every moment of the time interval defined by the run-off of the blocking apparatus a specific shutter opening surface, i.e. a specific shutter opening is assigned. From a functional point of view the disadvantage of this program control is primarily that the assignment of time and shutter values is neither well defined nor constant, but depends essentially on the run-off behavior of the blocking apparatus. This means that the precision setting of a desired shutter value depends on whether the run-off time of the blocking apparatus is always approximately the same, or whether the run-off time is subject to small or large variations from the prescribed value depending on modifying or interfering factors.

Another characteristic and disadvantage of the known program shutter design is also that for the setting of a particular exposure-time-shutter-value-pair, two time control chains, that run off in complete independence of one another, are the governing factor. These chains are formed by the mechanical blocking apparatus that retards the shutter opening movement and by an electrical time control circuit which initiates the closing process relative to the beginning of the run-off of the shutter system. The only synchronization of the two time control chains is their common start effected by the camera release device. But from this moment on there is no longer any interaction between the two time control chains. Whether or not the desired setting result of exposure time and shutter is actually achieved depends entirely on the operation of the mechanical blocking apparatus during run-off. If the blocking apparatus slows down too much or comes to a standstill, the result is a shutter opening that is too small causing an under-exposure, whereas over-exposure of the film material is the result when upon insufficient retardation an opening is set that is too large. The shutter setting and thus the exposure of the film material is therefore dependent on the run-off time of the mechanical blocking apparatus which slows down the opening movement of the shutter system.

It is an object of this invention to avoid the disadvantages of a program shutter of the type described above, by means of firmly assigned exposure time-opening pairings. This invention advantageously provides an electronically controlled shutter which avoids the use of an additional mechanical retarding apparatus that slows down the opening movement of the shutter blade system, and which furnishes the desired time-opening combinations in unmistakably defined values with reference to accuracy and stability. It has now been found that the foregoing object and other advantages can be provided in a camera where the opening of the shutter blade system which simultaneously serves to set the shutter aperture is done by a motorized drive apparatus that influences the setting member and periodically switches it forward. The motorized drive apparatus has an electronic control device which, with reference to the starting time of the motorized drive, gives off a switching impulse after a time interval that is pre-selected or determined depending on illumination with the aid of a light-sensitive element. The impulse is directed to an electro-magnetic device so that a separation of the drive apparatus from the setting device is brought about. In this manner it is possible to obtain a program shutter that is characterized by a precisely defined increase in shutter opening value per unit of time, and which consequently fulfills all prerequisites in accuracy and stability demanded of the exposure setting of an electronic camera. It is also important that the advantages characteristic of the conception of the invention, which result from completely electronic time and shutter setting, can be achieved without a mechanical blocking apparatus which slows down the opening movement of the shutter system.

A functionally advantageous conception of a motorized drive element that is also simple in design can be obtained according to the invention, because it is composed of a frequency generator and of a swing magnet. The swing magnet actuates a step mechanism, which includes a push pawl carried by the part of the swing magnet that moves back and forth, and which engages, through the pawl a sawtooth formed gearing provided on the setting unit of the shutter system. The use of a frequency generator offers a guarantee of a consistently constant time unit to set exactly matched time and shutter values. Since by use of a motorized drive of the shutter blade setter, only one chain of time control can become effective, and the assignment of time values to shutter values is just as well defined as exposure processes following one upon the other in relation to constancy.

Further objects and advantages of the invention will be apparent from a consideration of the following detailed description and the accompanying drawings wherein:

FIG. 1 is a view of the mechanical drive parts for the functioning of the shutter for the camera of this invention, including the switches located in the circuit of the electronic time control, and wherein the control disc serving to actuate these switches is illustrated in the cocked position, FIG. 2 is a side view of the control disc including the two switches which it is designed to actuate, FIG. 3 is a schematic diagram of the shutter circuit, FIG. 4 is a graph of the opening of the shutter, wherein the abscissa shows the exposure time and the ordinate shows the shutter opening belonging to it, FIG. 5 is a view similar to FIG. 1 with the parts illustrated in a position during the movement phase which effects the opening of the shutter blades.

FIG. 6 is a view similar to FIG. 1 with the shutter in the closed position of the blades, when the shutter changes over and the block and push pawls lift out of the toothed section of the setter, while the control disc serving to actuate the switches has not yet returned to the cocked position, FIG. 7 is a view of another embodiment of this invention where the switches in the circuit of the electronic control device are actuated by the camera release, FIG. 8 is a schematic diagram of the shutter circuit with the switches actuated by the release according to FIG. 7, FIG. 9 a partial perspective view of the camera release, FIG. 10 is a view of another embodiment of the drive of the step switch mechanism by an means of trip cams driven by electric motor.

DESCRIPTION OF THE PREFERRED EMBODIMENTS

Referring now to the drawings a pivoting setting piece 1 is coaxially mounted relative to an objective. The setting piece may be formed as a ring and is biased into contact with a fixed stop 3 by means of a spring 2. The starting position of the setting piece 1 corresponds to the closed position of the blades 4, of which only one is fully shown in the drawings for clarity of illustration. Each of these blades is mounted on a fixed pin 5 and guided by a control slot 1a of the setting piece 1 by means of a pin 6. Upon movement of the setting piece from the position illustrated in FIG. 1, the blades will open a steadily enlarging exposure passage as they swing around their pivot pins 5. This movement is identical with the opening of the shutter, because the blades 4 share in the function of providing an aperture. The setting piece 1 has on its circumference a saw-tooth-like gearing 1b in which both a blocking detent 7, preferably designed as a leaf spring, as well as a push pawl 8, also preferably designed as a leaf spring, are engaged. While the blocking detent 7 has a fixed mounting, the push pawl 8 is carried by the free-swinging North Pole end N of a permanent magnet 10 mounted in a pivoting fashion on a pin 9. The free-swinging end N of the permanent magnet 10 protrudes between the poles 11a and 11b, located opposite one another, of an electro-magnet consisting of a soft iron core 11 and a winding 12. The blocking detent 7 and the push pawl 8 are engaged in the teeth 1b of the setting piece 1 as illustrated in FIG. 1. This is made possible because an anchor 14 engages the soft iron core 15 of a holding magnet which also has a winding 16. Because of this design, a rotatable anchor lever 18 mounted on a fixed support pin 17 is positioned so that two pins 18a and 18b mounted thereon are incapable of influencing the blocking detent 7 and the push pawl 8. In this position the anchor lever 18 is movable against the force of a return spring 19, because its arm 20, suitably designed as an over-lift spring, rests on a pivotally mounted control disc 21. In FIG. 1, this disc is illustrated in the cocked position and is kept there against the bias of a spring 22 by a release lever 23. Two switches $S_1$ and $S_2$ work in concert with the control disc 21; these switches are in the circuit of an electronic control device which will be described later on in more detail. Upon run-off of the control disc 21, the two switches $S_1$ and $S_2$ are actuated one after the other by means of a switch cam 21a, in which process switch $S_1$ is closed and switch $S_2$ is opened. Another switch $S_3$, functioning as a parallel switch to the switch $S_1$, can be operated by a notch 1c provided on the circumference of the segment ring 1. In the rest position, as illustrated in FIG. 1, the switches $S_1$ and $S_3$ are open, while switch $S_2$, the opening of which starts the time setting process in the electronic control device, is closed. This switch position is also assumed by switches $S_1$, $S_2$ and $S_3$ in the schematic diagram illustrated in FIG. 3.

When the above described shutter is released by pressing the release lever 23 against the bias of a return spring 24, the control disc 21 runs off in a clockwise direction. First the switch $S_1$, kept open till now by a tang 21b, is forcibly closed by the curved piece or cam 21a, and thus the frequency generator 25, preferably designed as a square wave generator, the circuit structure of which is known, as well as the conventional sweep circuit, or relaxation or sawtooth oscillator 27 which serves to control the holding magnets 15 and 16, are connected to the voltage of a battery B. The permanent swing-magnet 10 which carries the push pawl 8 is brought into oscillating motion under the influence of electro-magnet 11, 12, which receives current impulses of changing polarity from the frequency generator 25. When this happens, the push pawl 8 which partakes in these movements, now switches the setter 1 in step-wise fashion. During this operation, the holding magnet 15, 16 is energized and holds the anchor 14 which is carried by the lever 18. In consequence of the turning motion of the setter 1, the blades 4 swing out in an opening direction. The mounting of the blades is arranged in such a manner that initially they only move within the range where they overlap, so that they do not initially open a light passage for the exposure. The turning of the setter 1 results further in the closing of the switch $S_3$, which because it is a parallel-switch to the switch $S_1$, has the task of keeping the circuit closed when switch $S_1$ shifts from the closed to the open position in the course of the rotary motion of the control disc 21. As the control disc 21 turns further the arm 20 of the anchor lever 18 eventually slides off the cam 21c. Nevertheless the anchor 14 remains in contact with holding magnet 15, 16 while current flows through its winding 16. Simultaneously with the aforementioned motion, the cam 21a, provided on the side of the control disc 21, slides under the switch $S_2$ and opens it. The push pawl 8 of the step-switch mechanism may have turned the setter 1 only to the point where the overlap phase of blades 4 is finished, so that the latter now start to free an opening. The contact breaking of the switch $S_2$ has the known effect on the circuit 27, whereby the switching process commences the charging of a condenser C across a photo-resistance R and thus the beginning of a time interval that depends on the light conditions. This is terminated by the connection through the sweep circuit.

The start of the time interval coincides with point A of the opening diagram illustrated in FIG. 4. In the course of the forward switching of the setter 1, the shutter blade system 4 opens in small steps, as diagrammatically illustrated in FIG. 4. The size of these steps depends on the division of the toothing 1b and upon the amplitude of the permanent swing-magnet 10 which is operatively connected to the toothing by the push pawl 8. For reasons of reliable functioning and for the obtaining exact exposure values, it is desirable to select the smallest technically and economically favorable tooth division and amplitude when designing the motor drive. The selection of the frequency of the generator 25 should be in accordance with the tooth division 1b in such a way that the time interval, between the beginning of the opening of the segments 4 (point A in FIG. 4) and the accomplished full opening (point B in FIG. 4), has a length from 60 to 100 ms. According to the diagram shown in FIG. 4, for example, the time period in which the opening movement of the blades 4 (A–B) takes place is approximately 63 ms. Also the spring 2, which opposes the opening movement of setter 1, can be designed in such a way that the setter returns into the closed position after disengagement from the blocking detent 7 and the push pawl 8 upon reaching the open position of the blades within 3 ms. In the diagram according to FIG. 4 this closing corresponds to the distance B – D. This means that the distance A – D would have a time spread of about 66 ms. When subject to the brightness of the object to be photographed the illumination of the photo-resistance R is just measured so that the electronic control device designed as a sweep circuit, or sawtooth or relaxation oscillator, is activated in the known manner when full opening is achieved, then the line B – D in FIG. 4 corresponds to the closing process of the shutter. This is caused by the holding magnet 15, 16 releasing the anchor 14. As consequence thereof the anchor lever 18 with its pins 18a and 18b, which is under the influence of the spring 19, disengages the blocking detent 7 as well as the push pawl 8 from the toothing 1b of the setter 1. When this happens, the setter 1 returns to the original position shown in FIG. 6 while simultaneously closing the blade system 4. Since in this case the opening characteristic of the shutter forms a figure resembling a triangle, the effective time corresponds to ½ of the total response time, which on the basis of the aforementioned values would be 33 ms or 1/30 s. If shutter value "2.8" were given as full opening, then the exposure data would be as follows: Shutter 2.8 – Time 1/30 sec (dotted line in FIG. 4). If the brightness of the object would be greater in relation to the conditions described above, then the exposure time, abscissa t in FIG. 4 and the shutter opening, ordinate k in FIG. 4, would both be reduced. If the shutter would not work in linear fashion in the usual sense, from shutter value to shutter value with the same setting distance, but would work in such a way that half of the setting distance would correspond to half the area, and a quarter of the setting distance would correspond to one quarter of the area, then the following table would be valid:

| Response Time | Shutter (aperture) | Effective Time |
| --- | --- | --- |
| 66 ms | 2.8 | 33 ms = 1/30s |
| 33 ms | 4 | 16.5 ms = 1/60s |
| 16.5 ms | 5.6 | 8.2 ms = 1/125s |
| 8.2 ms | 8 | 4.1 ms = 1/250s |
| 4.1 ms | 11 | 2 ms = 1/500s |

By reason of the triangle characteristic the effective time rises, and falls, only ½ as fast as the response time. This discrepancy, however, is compensated for by the simultaneous increase, or reduction, of the aperture. When point B in FIG. 4 is reached, the shutter aperture, which has now reached the maximum value, remains constant, so that a compensation is no longer necessary, since the increase in effective time corresponds exactly to the increase in response time. After the termination of the complete exposure cycle, the shutter reverts to the position illustrated in FIG. 6.

To bring about a renewed readiness for release, the control disc 21 is turned counter-clockwise in opposition to the return spring 22 until the release lever 23 snaps in behind the nose 21d of the disc 21. This setting corresponds to the cocked position illustrated in FIG. 1. To guide the control disc 21 into this position, a conventional mechanical connection, as indicated in FIG. 1 by dotted line, may be provided between disc 21 and the film transport lever 28 of the camera which accommodates the shutter. It is important, however, during the cocking process that the switch $S_1$ pass with its guide pin 30 provided on the free end thereof, under the curved piece or cam 21a to avoid closing of the contact, and not over it as during the run off. As a result, the guide pin 30 is lifted beyond its rest position. The control disc 21 is provided with a lug 21b to avoid establishing a contact upon the rebound of the switch part that carries the guide pin 30. The switch $S_2$ merely slides off the curved piece 21a and closes once more, whereby a short circuit is caused in the condenser C. The cam portion 21c also returns to the rest position shown in FIG. 1 so that contact once again is made between the anchor 14 and the magnet core 15 by means of the arm 20 provided on the anchor lever 18. The winding 16 of magnet core 15 is without current and an effective contact is made between the anchor 14 and the magnet core 15.

According to the schematic diagram shown in FIG. 3, the time control resistance assigned to the condenser is a photo-resistance, which, depending on light conditions, automatically regulates the time interval during which the motor drive affects the setter 1. For the same purpose several fixed resistors can be used in lieu of the photo-resistance to permit to the photographer a definite time-shutter program pre-selection. A combined use of a photo-resistance and several fixed resistances is also possible in conjunction with a suitable circuit component which makes the alternating inclusion of one of these resistances into the sweep circuit possible. Thus the photographer would be given the option of taking pictures with light dependent program-setting as well as pre-selectable program-setting.

Another embodiment of this invention is illustrated in FIGS. 7 through 9. In this embodiment, the actuation of the switches located in the circuit of the electronic control arrangement is not achieved by a control disc that regulates the sequence of the functions, but by a release device 35 of the camera. For this purpose the camera release 35 is provided with switch cams 36, 37 and 38. In this embodiment, the mechanical transmission parts of the shutter, its drive components consisting of the frequency generator and the step switch mechanism, are the same as in the embodiment illustrated in FIGS. 1 through 6. The same reference numeral or letter has been used for similar parts, but for clarity, the references have a prime apostrophe in FIGS. 7-9. In the embodiment of FIGS. 7 through 9, a parallel switch to switch $S_1'$ is not necessary, but a complementary switch $S_{1a}$ must be assigned to it for functional reasons. Furthermore the switch $S_2'$, which starts the charge of the Condenser C', is actuated by the setter 1', and a switch $S_4$ is assigned to the anchor lever 18', which interrupts the flow of current from the battery B' to the frequency generator 25' and the sweep circuit 27' upon disengagement of the step switch mechanism 7', 8' when the switches $S_1'$ and $S_{1a}$ are closed.

The positioning of switch cams 36, 37 on the camera release 35 is so arranged in relation to the two switches $S_1'$ and $S_{1a}$ that on pressing the camera release 35, first of all the switch $S_1'$ is guided into closed position. The free end of the pressure spring 20' attached to the anchor lever 18', which spring is fitted with a guide pin 39, now runs onto a switch with spring tongs 40 that is also attached to the release 35. This occurs in such a manner that the pin 39 and thereby the pressure spring 20' finally loses its support, whereby the anchor 14' is freed. The latter is, however, kept in contact with the electro-magnet 15', 16' inasmuch as switches $S_1'$ and $S_4$ are closed so that through these switches and the sweep circuit, current is fed to the electro-magnet. In the course of a further displacement of the release 35, the cam 37 finally actuates the switch $S_{1a}$, with the consequence, that the frequency generator 25' is also energized. The step switch mechanism 7', 8' then starts working and moves the setter 1' counterclockwise step by step as viewed in FIG. 7. On inception of the run-off motion, the blades 4' are opening an aperture on the one hand, while on the other hand switch $S_2'$ is opened in synchronous fashion. This operation starts the charge of the condenser C' across the photo-resistance R'. If the sweep circuit 27' assumes control according to a time interval that depends on existing light conditions, then the electro-magnet 15', 16' releases the anchor 14'. As a consequence, the return spring 19', which is connected to the anchor lever 18' through the pins 18a' and 18b', lifts the push pawl and blocking detent 8', 7' out of the toothed section 1b. Instantly the return positioning of the setter 1' commences under the influence of spring 2'. The positioning is ended as soon as the tang provided on the setter 1' runs onto the fixed stop 3'. This concludes the exposure process during which the blades 4' have simultaneously taken over the function of a shutter.

Upon the return movement of the release 35 into its original position, the switch $S_{1a}$ is opened first of all, and immediately thereafter the switch $S_1'$ is also actuated while the pin 39 provided on the free end of the support spring 20' slides under the switch with spring tongs 40 and finally lifts it, as illustrated in FIG. 9, so that the pin 39 again reaches the upper edge of the switch cam 38. To avoid the return of the release 35 in the case of setting of ultra-long exposure times owing to insufficient light conditions prior to control by the sweep circuit 27', a blocking lever 42 is provided. This blocking lever is in a fixed position and is under the influence of a spring 43. The lever 42 which is fitted with a blocking nose 42a works together with a blocking nose 38a provided on the switch cam 38. Furthermore, the positioning of the blocking lever is so arranged that, in the rest position of the setter 1', it comes to a stop, under the influence of spring 43, on a pin 44 attached to the setter. If the setter 1' leaves the starting position, the lever 42 follows the pin 44 and changes thereby into the blocked position. When the release 35 reaches the release position, the two blocking noses 38a and 42a hook onto one another, which results in a blocking of the release 35 in the release position. When the setter 1' returns to the original position illustrated in FIG. 7, then the pin 44 knocks the blocking lever 42 out of the blocking position and thus permits the release 35 to return to its original position.

As shown in FIG. 10, the push pawl 8'' mounted on a pendulum type lever 47, could also be driven by a DC motor 48 in such a manner, that a cam 50 operates the lever 47 which carries a push pawl 8'' and is under the bias of a return spring 49. The cam 50 is in mechanical connection with the drive pinion 52 of the electric motor 48 through a step-down gearing 51. To assure a drive of the step switch mechanism, formed by the push pawl 8'' and blocking detent 7'', independent of the load and battery voltage, it is desirable to place the DC motor 48 in a conventional circuit that regulates the rotation. The determination of the time interval, during which the setter 1' that causes the blades to swing outwardly is under the influence of the switch cam 50, can be accomplished by an electronic control device, as illustrated in FIG. 8. The frequency generator 25', and the electro-magnetic drive 10', 11' assigned to it are replaced by the DC motor 48, the step-down gearing 51 and the switch cam 50.

It will be understood that various changes in the details, materials, steps and arrangements of parts, which have been herein described and illustrated in order to explain the nature of the invention, may be made by those skilled in the art within the principle and scope of the invention.

Having thus described the invention, the following is claimed:

1. A photographic camera including a shutter blade system simultaneously serving as a diaphragm aperture device, comprising, in combination, a setter connected to said blade system and operable to move said blade system out of its closed position; a return spring engaged with said setter and biasing the same to move said blade system to its closed position; motorized drive means operatively associated with said setter and operable to actuate said setter to move said blade system out of its closed position; electromagnetic means operatively associated with said drive means to control connection of said drive means to said setter; electronic control means connected to said drive means and to said electromagnetic means and operable, responsive to operation of a release member, to energize said drive means and to condition said electromagnetic means to connect said drive means to said setter; and time constant responsive means in said control means operable, when a time period following energization of said drive means results in a predetermined time constant, to condition said electromagnetic means to disconnect said drive means from said setter for return of said setter to a position moving said blade system to its closed position, by said return spring.

2. The photographic camera of claim 1, in which said drive means includes a frequency generator; an electromagnetic device, including an oscillatable permanent magnet, connected to said frequency generator for energization thereby; a mechanical stepping mechanism connected to said oscillatable permanent magnet and including a push pawl carried by said permanent magnet; said setter having a circular periphery provided with saw-like teeth engageable by said push pawl for driving of said setter by said drive means.

3. The photographic camera of claim 2, in which said time constant responsive means comprises a sweep circuit connected to an RC member.

4. The photographic camera of claim 3, in which said electromagnetic means comprises a holding electromagnet; a pivotally mounted lever; an armature carried by said lever and cooperable with said electromagnet for movement of said lever in a direction providing for engagement of said push pawl with said saw teeth; and a spring biasing said lever to a position disengaging said push pawl from said saw teeth.

5. The photographic camera of claim 3, including mechanical switches connected in the circuit of said electronic control means; and a spring biased control disk with an associated plurality of cams operable to actuate said switches.

6. The photographic camera of claim 5, in which said control disk is movable into a cocked position against its spring bias; and positioning means operatively associating said lever and said control disk and swinging said lever to a position engaging said armature with said electromagnet responsive to movement of said control disk into the cocked position.

7. The photographic camera of claim 4, including a camera release; mechanical switches included in said electronic control means; and control means on said camera release operable to actuate said mechanical switches.

8. The photographic camera of claim 1, in which said drive means comprises mechanical stepping means including a push pawl; said setter having a circular periphery provided with saw teeth engageable by said push pawl; a DC motor; circuit means controlling energization of said DC motor; a rotatable switching cam operable to actuate said mechanical stepping means; and intermediate gearing mechanically connecting said DC motor and said switching cam.

* * * * *